United States Patent [19]

Fukatsu et al.

[11] Patent Number: 4,941,353
[45] Date of Patent: Jul. 17, 1990

[54] GAS RATE GYRO

[75] Inventors: Yoshiaki Fukatsu, Nagoya; Etsuji Nomura, Ichinomiya; Kazuma Matsui, Toyohashi, all of Japan

[73] Assignee: Nippondenso Co., Ltd., Kariya, Japan

[21] Appl. No.: 296,191

[22] Filed: Jan. 12, 1989

[30] Foreign Application Priority Data

Mar. 1, 1988 [JP] Japan ............... 63-48445

[51] Int. Cl.$^5$ .................................. G01P 9/00
[52] U.S. Cl. ........................ 73/505; 73/516 LM
[58] Field of Search ......... 73/516 LM, 516 R, 517 R, 73/505

[56] References Cited

U.S. PATENT DOCUMENTS

| | | | |
|---|---|---|---|
| 3,360,677 | 12/1967 | Stocker et al. | 73/516 LM |
| 3,910,122 | 10/1975 | Evans et al. | 73/516 LM |
| 4,393,707 | 7/1983 | Ferrar | 73/516 LM |

FOREIGN PATENT DOCUMENTS

| | | |
|---|---|---|
| 58-71465 | 4/1983 | Japan. |
| 60-133369 | 7/1985 | Japan. |
| 61-256216 | 11/1986 | Japan. |

Primary Examiner—John Chapman
Attorney, Agent, or Firm—Cushman, Darby & Cushman

[57] ABSTRACT

A hermetic tubular casing hermetically containing a gas substantially at the atmospheric pressure is mounted on a mobile object, such as a vehicle, and is provided with a needle electrode at one end thereof and a pair of adjacent semicircular plate electrodes at the other end thereof. A high-voltage power supply applies a high voltage across the needle electrode and the plate electrodes to generate an ionic wind flowing from the needle electrode toward the plate electrodes by producing a corona discharge around the needle electrode. An arithmetic unit detects the difference between ionic currents flowing respectively through the pair of plate electrodes and each corresponding to the number of ions fallen on the corresponding plate electrode. The ionic wind is deflected under the action of a Coriolis force as the mobile object revolves entailing variation in the quantity of ions falling on each plate electrode. The difference between the ionic currents varies in proportion to the angular velocity of the mobile object.

8 Claims, 9 Drawing Sheets

GAS RATE GYRO

BACKGROUND OF THE INVENTION

1. Field of the Invention

The present invention relates to a gas rate gyro set on a mobile object, such as a vehicle or a ship, to detect the rotatory motion of the mobile object and, more particularly, to a gas rate gyro which detects the angular velocity of a rotatory motion of a mobile object through the detection of a Coriolis force acting on an ionic wind generated in a casing.

2. Description of the Prior Art

The gas rate gyro measures the angular velocity of a mobile object through the measurement of a Coriolis force acting on a gas current. The gas rate gyro is features by the small number of component parts, low cost, high vibration resistance and capability of being set simply on a vehicle or the like.

Japanese Patent Laid-open (Kokai) No. 60-133369 discloses a gas rate gyro not having any mechanical functional component, such as a pump in which a gas is ionized in an electric field to generate a gas current. Japanese patent Laid-open (Kokai) No. 61-256216 discloses a similar gas rate gyro, in which a rare gas sealed in a glass case is ionized by a discharge to form a plasma, a plasma jet is formed in the rare gas by an annular accelerating electrode for attracting charged particles and an annular focusing electrode for focusing the jet of charged particles, and a Coriolis force acting on the plasma jet is detected. Japanese Patent Laid-open (Kokai) No. 58-71465 discloses a gas rate gyro, in which an ionic wind generated by a corona discharge is used as a pump for forming a jet of gas, the jet of gas is ionized by a radiation source, and the ions are detected.

Since the known gas rate gyro detects the angular velocity of a mobile object by using the plasma jet in a vacuum or in a rare gas, the flow speed of the plasma current, i.e., a current of ions, in the vacuum or in the rare gas is very high. It is known that the deflection of the current of ions subjected to the action of a Coriolis force is dependent on the flow speed of the current of ions; that is, the deflection Y is in inverse proportion to the flow speed of the current of ions, is in proportion to the square of the distance L between the electrodes and is in proportion to the angular velocity $\omega$ of the rotating mobile object. Thus, the current of ions is deflected by a Coriolis force acting thereon, and the deflection of the current of ions is in proportion to the flow speed of the current of ions. Since the flow speed of the current of ions in a high vacuum or in a rare gas is very high, the distance L between the electrodes must be very large to detect the deflection Y of the current of ions at a satisfactory accuracy, namely, to make the deflection Y large, which inevitably increases the size of the gas rate gyro. The gas rate gyro using radioactive rays entails injurious effect on the environment in the manufacture and use of the gas rate gyro.

SUMMARY OF THE INVENTION

The present invention is intended to provide a gas rate gyro using a current of ions of a comparatively low flow speed which can be deflected comparatively greatly by a Coriolis force, yet not require any radiation source.

Accordingly, it is an object of the present invention to provide a compact gas rate gyro comprising a casing set on a mobile object and electrodes disposed at a comparatively small distance from each other, and being capable of forming a current of ions within the casing and deflecting the current of ions greatly by a comparatively small Coriolis force without using any radiation source.

It is another object of the present invention to provide an accurate gas rate gyro capable of surely arresting ions.

To achieve the object of the invention, the present invention provides a gas rate gyro to be set on a mobile object to detect the motion of the mobile object through the measurement of the deflection of a gas current varying according to the motion of the mobile objects, comprising: a casing set on the mobile object and hermetically containing a gas therein; first and second electrodes disposed opposite to each other within the casing; a high-voltage power supply which applies a voltage across the first and second electrodes to generate a corona discharge on the first electrode which generates an ionic wind of a mixture of the neutral molecules of the gas contained in the casing and ions produced by ionizing the neutral molecules, directed from the first electrode toward the second electrode; detecting electrodes disposed within the casing at a predetermined distance from the first electrode where the ions produced by the corona discharge are not annihilated, to give electrons to the ions of the ionic wind; and a rotatory motion detecting circuit which detects the rotatory motion of the mobile object through the measurement of the deflection of the ionic wind according to the motion of the mobile object by detecting the magnitude of a current of ions corresponding to the flow of the electrons flowing through the detecting electrodes.

According to the present invention, a high voltage is applied across the first and second electrodes to generate a corona discharge around the first electrode. The corona discharge is generated by the partial spark breakdown of the gas around the first electrode within the hermetic casing. Then, the gas substantially consisting of neutral molecules is ionized by the corona discharge to produce ions. Since the ions have positive electric charge, the ions are accelerated by an electric field toward the second electrode of a negative potential. During the travel toward the second electrode, the ions produced around the first electrode collide against neutral molecules of the gas, and thereby the flow speed of the ions is reduced and the neutral molecules are urged by the ions toward the second electrode thus producing an ionic wind generally flowing from the first electrode toward the second electrode. This ionic wind is a flow of a gas consisting of the neutral molecules of the gas sealed in the casing and the ions produced by ionizing the gas sealed in the casing. The detecting electrodes disposed at a predetermined distance from the first electrode is exposed to the ionic wind. Ions contained in the ionic wind impinge on the detecting electrodes and acquire electrons from the detecting electrodes to form neutral molecules. Thus, a current of the gas is generated, ions are produced continuously and a continuous current of ions is generated within the casing. When the mobile object performs a rotatory motion, such as a revolving motion, with the gas rate gyro in the foregoing state, a Coriolis force is generated in the current of ions within the casing, and thereby the current of ions is deflected by a deflection proportional to the angular velocity of the revolving motion and in inverse proportion to the flow speed on the ions. However, since the gas rate gyro of the present invention uses the ionic wind, the ions collide against the neutral molecules and flow at a flow speed far lower than the flow speed on ions in a high vacuum or in a rare gas; consequently, the current of ions is defected greatly by a small Coriolis force. Accordingly, a small variation of the Coriolis force, hence, the angular velocity, can be detected even if the detecting electrodes which give electrons to the ions are disposed at a short distance from the first electrode. Accordingly, the gas rate gyro can be formed in a compact construction. Furthermore, since the detecting electrodes are disposed at a predetermined comparatively short distance from the firs& electrode where the ions generated around the first electrode by a corona discharge are not annihilated naturally, the gas rate gyro need not be provided with any radiation source.

Notwithstanding the arrangement of the electrodes at short intervals, the gas rate gyro is able to detect the angular velocity of a rotatory motion of the mobile object at a sufficient accuracy, since the gas rate gyro uses a low-speed ionic wind generated by a corona discharge as a gas current; consequently, the casing carrying the electrodes may be a small one. Since the gas rate gyro needs only an electrode for producing an ionic wind and an electrode for detecting the flow of the ionic wind and need not be provided with any focusing electrode and any accelerating electrode, namely , the gas rate gyro needs substantially only electrodes for producing a plasma and detecting the plasma, the gas rate gyro is simple in construction and inexpensive. Furthermore, since the detecting electrodes are disposed at a predetermined distance from the first electrode so that the detecting electrodes are able to detect the ions in the ionic wind, the gas rate gyro needs no radiation source, and hence the gas rate gyro has no injurious influence on the environment.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

Figure 1:
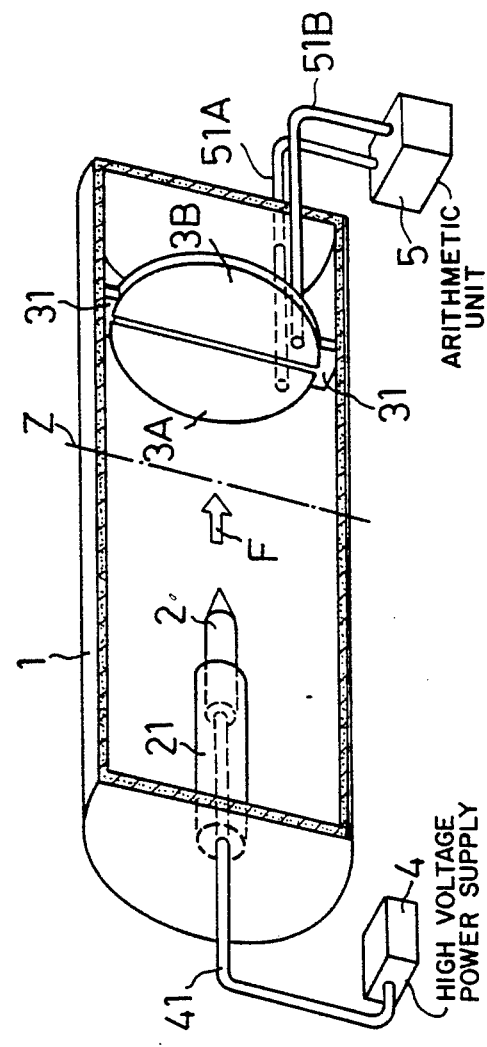
FIG. 1 is a partially cutaway perspective view of a gas rate gyro in a first embodiment according to the present invention, typically showing the internal construction of a casing.

First Embodiment (FIGS. 1 to 7):

Referring to FIG. 1, a gas is sealed in a hermetic tubular casing 1 at a pressure of 1 atm, ±50 mmHg. The gas is nitrogen gas, dry air, an inert gas or a mixture of those gases. The casing 1 is formed of an insulating material, such as glass or resin. A tubular insulating needle holder 21 is attached to one end of the casing 1 while a pair of plate electrodes 3A and 3B are disposed near the other end of the casing 1 and are held at the upper and lower ends thereof by electrode holders 31. A needle electrode 2, having a 10 mm diameter and having a conical tip, is held by the needle holder 21 in alignment with the axis of the casing 1. The plate electrodes 3A and 3B have the same semicircular shape and are disposed opposite to the needle electrode 2 with the straight sides thereof opposite to each other. The diameter of a circular shape formed by the plate electrodes 3A and 3B is 80% of the inside diameter of the casing 1, and the center of the circular shape is on the axis of the casing 1. A high-tension cable 41 has one end connected to the needle electrode 2 and the other end connected to a high-voltage power supply 4. Signal lines 51A and 51B connected to an external arithmetic unit 5 are connected respectively to the plate electrodes 3A and 3B.

Figure 2:
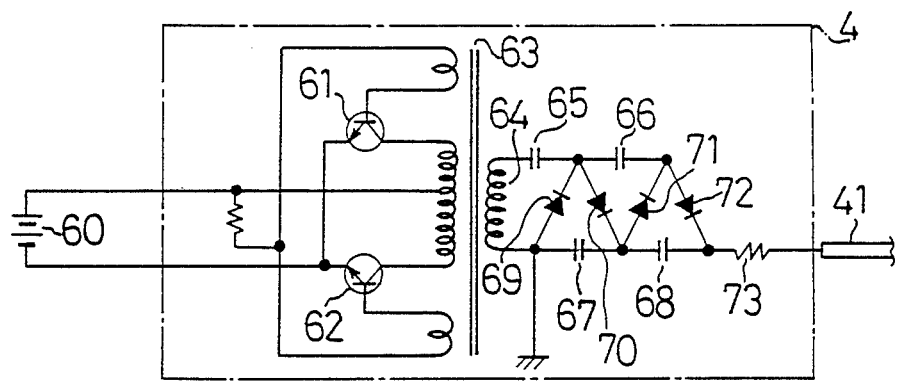
FIG. 2 is a circuit diagram of a high-voltage power supply incorporated into the gas rate gyro of FIG. 1.

Referring to FIG. 2 showing the high-voltage power supply 4 connected to a battery 60 mounted on the mobile object, there are shown transistors 61 and 62, a transformer 63, capacitors 65, 66, 67 and 68, diodes 69, 70, 71 and 72, and a discharge resistance 73. The transistors 61 and 62 and the transformer 63 constitute an oscillation circuit for converting a dc input into an ac output. A boosting circuit consisting of the capacitors 65 to 68 and the diodes 69 to 72 is connected to the secondary winding 64 of the transformer 63.

Figure 3:
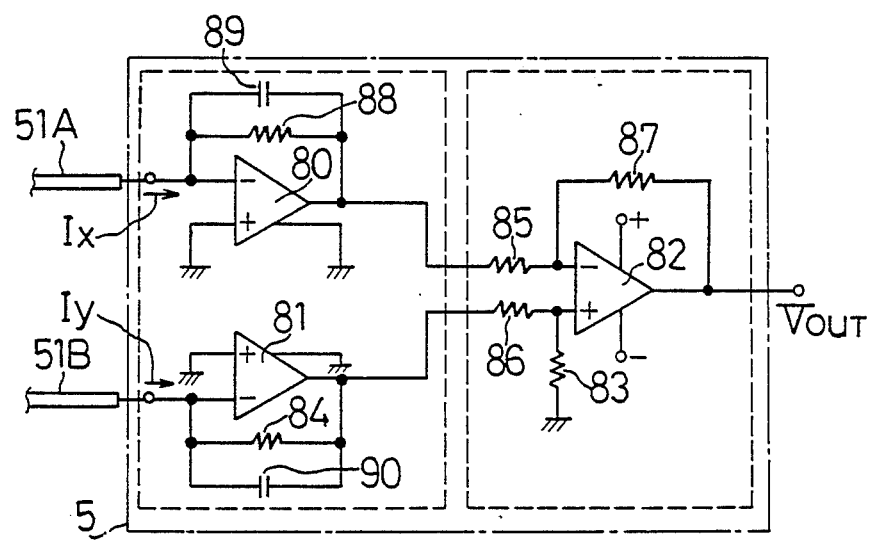
FIG. 3 is a circuit diagram of an arithmetic unit incorporated into the gas rate gyro of FIG. 1.

Referring to FIG. 3 showing the arithmetic unit 5, there are shown the signal lines 51A and 51B, operational amplifiers 80 and 81 for amplifying minute currents, a differential amplifier 82, resistors 83 to 88 and capacitors 89 and 90. The respective output terminals of the operational amplifiers 80 and 81 are connected respectively to the positive and negative input terminals of the differential amplifier 82. A voltage corresponding to the difference between the minute currents, namely, ionic currents, flowing through the signal lines 51A and 51B appears at the output terminal of the differential amplifier 82.

In operation, the high-voltage power supply 4 boosts the output voltage of 12 V of the battery 60 to a high voltage of 5.2 kV and applies the high voltage to the needle electrode 2(first electrode) to form an electric field of an intensity in the range of 3 KV/cm to 10 KV/cm between the needle electrode 2 and the plate electrodes 3A and 3B. Consequently, a nonuniform electric field is formed around the tip of the needle electrode 2 causing partial spark to generate a corona discharge.

The molecules of the gas sealed in the casing 1 are ionized by the corona discharge to produce positive ions. The positive ions are accelerated by the electric field so as to travel toward the plate electrodes 3A and 3B. During the travel toward the plate electrodes 3A and 3B, the positive ions collide against the neutral molecules of the gas to urge the neutral molecules toward the plate electrodes 3A and 3B, so that an ionic wind F (FIG. 1) is generated. The flow speed of the ionic wind F is lower than that of a current of ions in a vacuum or in a rare gas, because the flow of the ions is impeded by the neutral molecules. The flow speed of the ionic wind F is on the order of several meters per second.

Upon impingement on the plate electrodes 3A and 3B, the positive ions contained in the ionic wind F receive electrons from the plate electrodes 3A and 3B and become neutral molecules, and thereby ionic currents $I_x$ and $I_y$ flow through the plate electrodes 3A and 3B. To enable the positive ions produced by the corona discharge to reach the plate electrodes 3A and 3B, the needle electrode 2 and the plate electrodes 3A and 3B must not be excessively widely spaced. In this embodiment, the distance between the needle electrode 2 and the plate electrodes 3A and 3B is 16 mm.

Figure 4:
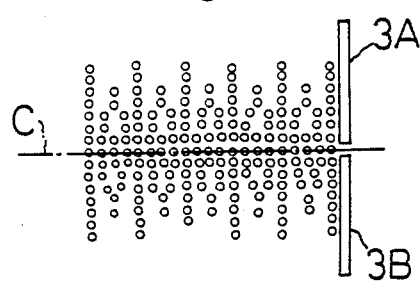
FIGS. 4 and 5 are diagrammatic illustrations explaining the relation between ionic currents and detecting electrodes in the gas rate gyro of FIG. 1.

The ionic currents are proportional respectively to the numbers of positive ions arrested by the plate electrodes 3A and 3B. When the ionic wind F is not deflected, the same number of positive ions fall on the plate electrodes 3A and 3B, since the ion density distribution is symmetrical with respect to the axis C of the casing as shown in FIG. 4. The ion density decreases from the central portion of distribution toward the peripheral portion of the same.

The arithmetic unit 5 shown in FIG. 3 detects the difference current between the ionic currents flowing respectively through the signal lines 51A and 51B. While the ionic wind F is not deflected, the difference current is zero.

Figure 5:
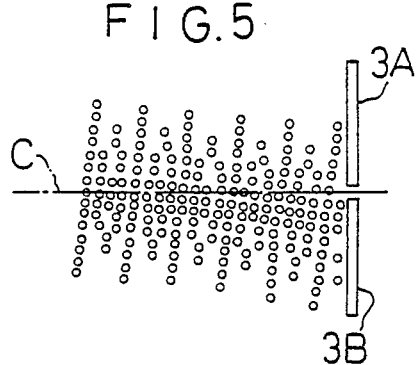

When the mobile object revolves about an axis Z (FIG. 1) perpendicular to the axis C of the casing 1, a Coriolis force acts on the ionic wind F to deflect the ionic wind F in the direction of action thereof, varying the ion density distributions on the plate electrodes 3A and 3B in a mode as shown in FIG. 5, in which the ionic wind F is deflected toward the plate electrode 3B, causing different ionic currents flow respectively through the plate electrodes 3A and 38.

Figure 6:
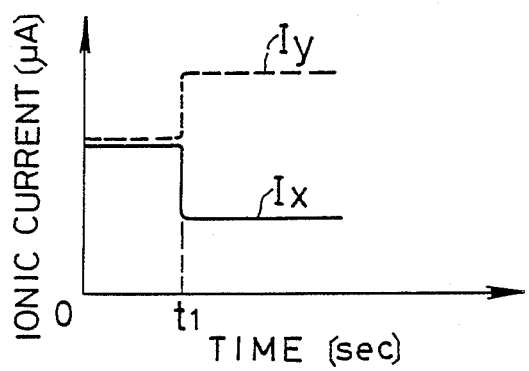
FIG. 6 is a graph showing the variation of ionic currents under the action of a Coriolis force.
Figure 7:
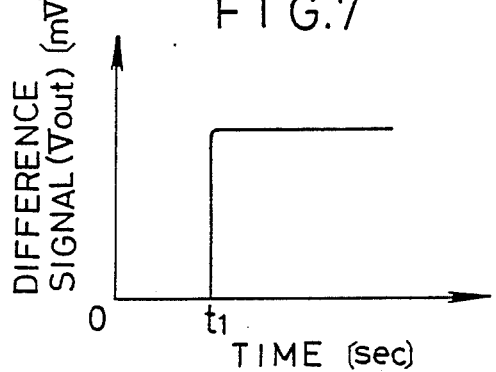
FIG. 7 is a graph showing the characteristics of a difference signal, namely, an output signal of a detecting circuit corresponding to the variation of the ionic currents shown in FIG. 6.

FIG. 6 shoWs the variation of the ionic currents $I_x$ and $I_y$ flowing respectively through the signal lines 51A and 51B with time, in which the ionic current is measured on the vertical axis and time is measured on the horizontal axis. During a time period between a time 0 to a time $t_1$ in which the ionic wind F is not under the influence of the Coriolis force, the ionic currents $I_x$ and $I_y$ are equal to each other. When the Coriolis force acts on the ionic wind F, the ionic current $I_y$ increases while the ionic current $I_x$ diminishes. That is, the number of ions falling on the plate electrode 3B increases while the number of ions falling on the plate electrode 3A diminishes, and thereby the ionic currents $I_x$ and $I_y$ become different from each other as shown in FIG. 6. Consequently, the differential amplifier 82 (FIG. 3) provides a difference signal $V_{out}$ at the time $t_1$ (FIG. 7) when the Coriolis force starts acting on the ionic wind F. The arithmetic unit 5 detects the deflection of the ionic wind from the difference signal and calculates the angular velocity of the mobile object.

Figure 8:
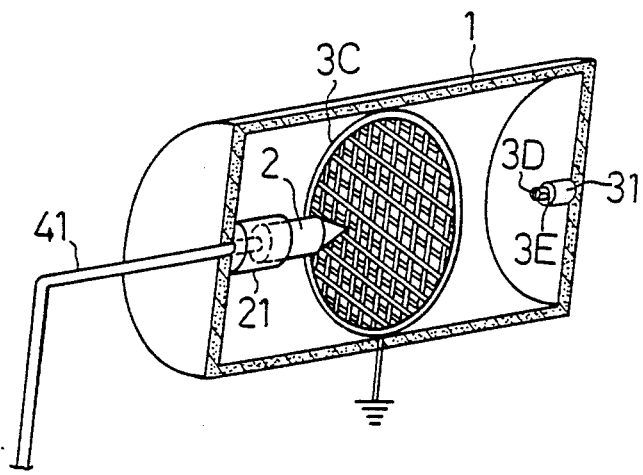
FIG. 8 is a partially cutaway perspective view of a gas rate gyro in a second embodiment according to the present invention, typically showing the internal construction of a casing.
Figure 9:
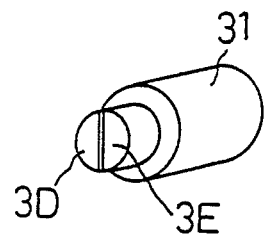
FIG. 9 is an enlarged perspective view of detecting electrodes employed in the gas rate gyro of FIG. 8.
Figure 10:
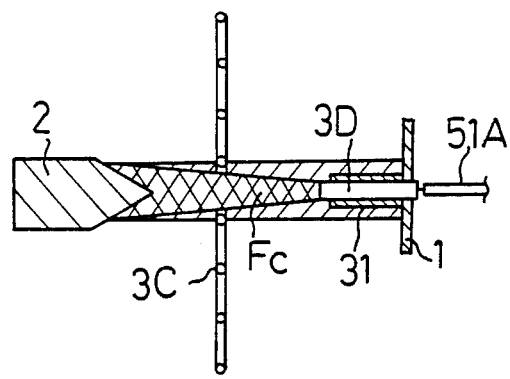
FIG. 10 is an illustration explaining the relation between an ionic wind and electrodes in the gas rate gyro of FIG. 8.

Second Embodiment (FIGS. 8 to 10):

A gas rate gyro in the second embodiment is designed for further stable and accurate ionic current detection. Referring to FIG. 8, a disk shaped grid electrode 3C is disposed at the middle of a tubular casing 1 with the circumference thereof in contact with the inner surface of the casing 1. The electrode 3C is a grid formed of wires of 0.5 mm in diameter arranged to form meshes of 6 mm × 6 mm in size. A needle electrode 2 and a pair of detecting split electrodes 3D and 3E are held opposite to the grid electrode 3C on one end and on the other end, respectively of the casing 1. The detecting split electrodes 3D and 3E have a semicircular cross section forming a portion of a circle of 3 mm in diameter and are held by an insulating electrode holder 31 with the respective straight sides opposite to each other Referring to FIG. 9, the conductive detecting split electrodes 3D and 3E penetrate the insulating electrode holder 31 attached to the end plate of the casing 1. The detecting split electrodes 3D and 3E correspond to the plate electrodes 3A and 3B of the first embodiment shown in FIG. 1. The high-voltage power supply (FIG. 2) employed in the first embodiment may be applied to the second embodiment. The high-voltage power supply is connected to the needle electrode 2 by a high-tension cable 41 to the needle electrode 2. The detecting split electrodes 3D and 3E are connected to a detecting circuit having operational amplifiers 80 and 81 and a differential amplifier 82, which is similar to the arithmetic unit of FIG. 3, respectively by signal lines 51A and 51B. Referring to FIG. 10, typically illustrating the flow of an ionic wind in the second embodiment, ions produced around the needle electrode 2 flow toward the grid electrode 3C in an ionic wind. The ionic wind has a central potential core FC which does not interact with the stationary gas surrounding the ion wind, has only slight disturbance in the flow and has a high ion density relative to the peripheral portion of the ion wind. The potential core has a diameter of approximately 60% of the diameter of the needle electrode 2 and a length of approximately five times the diameter of the needle electrode 2. When the diameter of the needle electrode 2 exceeds 10 mm, the accuracy of detection is deteriorated. Accordingly, the length of the potential core FC is approximately 30 mm or less and it is desirable to dispose the detecting split electrodes 3D and 3E within the potential core FC. The size of the mesh of the grid electrode 3C is somewhat greater than the diameter of the potential core FC so that the potential core FC extends behind the grid electrode 3C, and the detecting split electrodes 3D and 3E are disposed in the rear portion of the potential core FC. The detecting split electrodes 3D and 3E are connected to signal lines 51A and 51B as shown in FIG. 3.

Thus, in the second embodiment, the ions in the least disturbed potential core FC of the ionic wind are detected, and hence the variation of the ionic currents can be stably measured to achieve highly accurate measurement.

Figure 11:
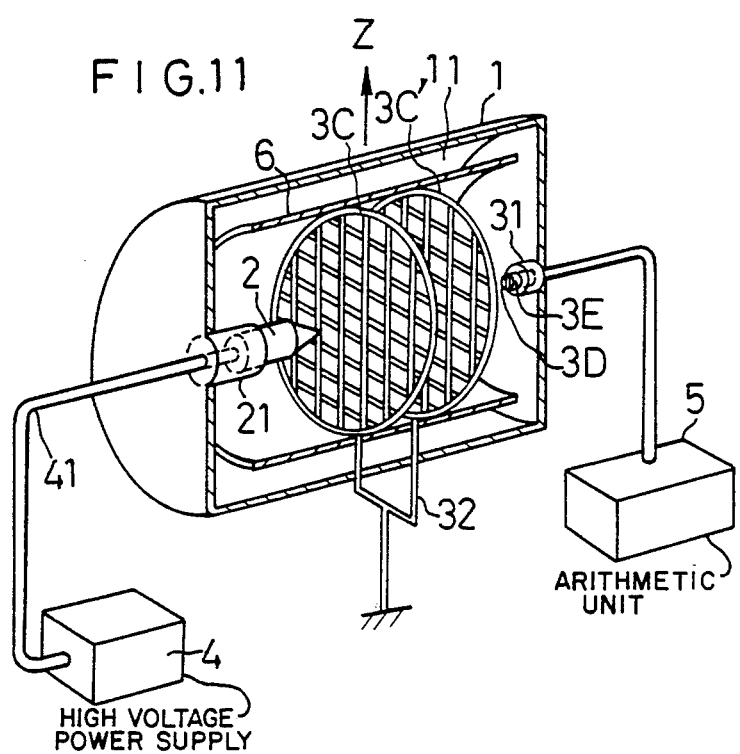
FIG. 11 is a partially cutaway perspective view of a gas rate gyro in a third embodiment according to the present invention, typically showing the internal construction of a casing.
Figure 12:
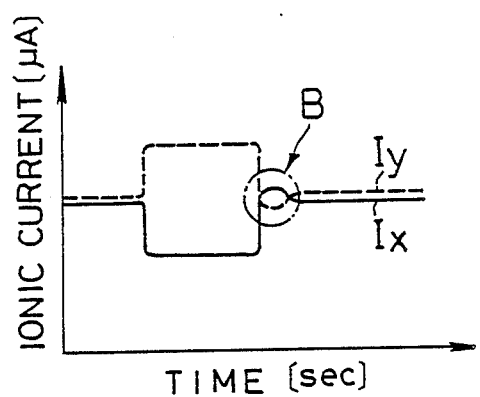
FIG. 12 is a graph of assistance in explaining the characteristics of the gas rate gyro of FIG. 8.
Figure 13:
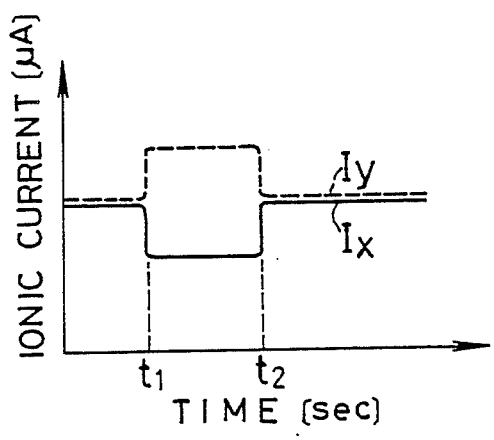
FIG. 13 is a graph showing the characteristics of the gas rate gyro of FIG. 11.

Third embodiment (FIGS. 11 to 13)

Referring to FIG. 11, a casing 1 is provided internally with a tubular partition wall 6 having a diameter smaller than that of the casing 1. The partition wall 6 is coaxial with the casing 1. A needle electrode 2 and a pair of detecting split electrodes 3D and 3E are disposed respectively at the opposite ends of the casing 1. A pair of disk-shaped grid electrodes 3C and 3C' are disposed at a predetermined axial interval (in this embodiment, the distance between the opposing surfaces is 2 mm) between the needle electrode 2 and the detecting split o electrodes 3D and 3E, and are interconnected electrically by grounded lead wires 32, so that the grid electrodes 3C and 3C' are at the same potential. The grid electrodes 3C and 3C' are the same as the grid electrode 3C of the second embodiment in size and shape. The grid electrodes 3C and 3C' form a space having no electric field distribution.

The function of the grid electrodes 3C and 3D will be described hereinafter. FIG. 12 shows the ionic current characteristics of the gas rate gyro in the second embodiment shown in FIG. 8, and FIG. 13 shows 1 he ionic current characteristics of the gas rate gyro in the third embodiment provided with the two grid electrodes 3C and 3C'. In some cases, the ionic currents flowing through the detecting electrodes 3D and 3E drift slightly by a drift B in directions opposite the direction of variation caused by the angular velocity as shown in FIG. 12 upon the termination of the revolving motion of the mobile object, namely, upon the reduction of the angular velocity of the mobile object to zero. The drift 8 is considered to be due to some influence of residual ions remaining on the side of deflection of the ionic wind on the ionic wind, which sometimes is a problem in detecting a very low angular velocity on the basis of the variation of the ionic currents.

In the third embodiment, when a corona discharge occurs between the needle electrode 2 and the grid electrode 3C' an ionic wind flows through the grid electrodes 3C and 3C' toward the detecting electrodes 3D and 3E. Since the space not having any electric field distribution is formed between the grid electrodes 3C and 3C', no ion remains on the side o: deflection and the potential core reaches the detecting electrodes 3D and 3E without being affected by the residual ions, and hence the drift B as shown in FIG. 12 does not appear in the ionic current variation curve. In FIG. 13 showing the ionic current characteristics of the third embodiment, a Coriolis force acts on the ionic wind during a time period between a time $t_1$ and a time $t_2$, and at the time $t_2$, namely, a moment when the angular velocity of the mobile object becomes zero, the ionic currents $I_x$ and $I_y$ coincide with each other, and thereby the extinction of the Coriolis force at the time $t_2$ is detected accurately

Figure 14:
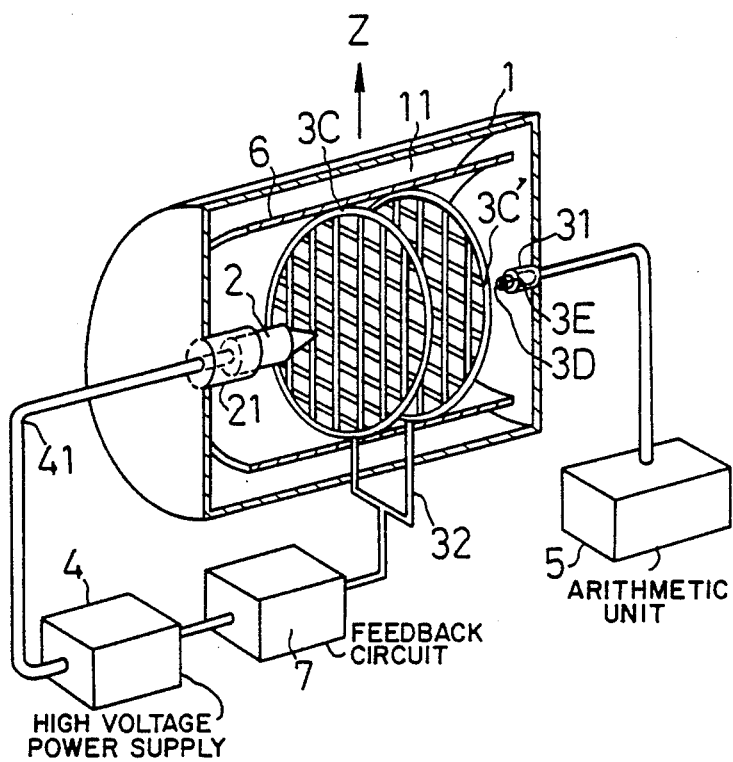
FIG. 14 is a partially cutaway perspective view of a gas rate gyro in a fourth embodiment according to the present invention, typically showing the internal construction of a casing.

Fourth Embodiment (FIGS. 14 and 15):

A gas rate gyro in the fourth embodiment is featured by the stabilization of a constant corona discharge. The construction of the gas rate gyro shown in FIG. 14 is substantially the same as that of the gas rate gyro in the third embodiment shown in FIG. 11, except that grid electrodes 3C and 3C' of the fourth embodiment are connected to a feedback circuit 7. The arithmetic unit 5 shown in FIG. 3 is employed.

Figure 15:
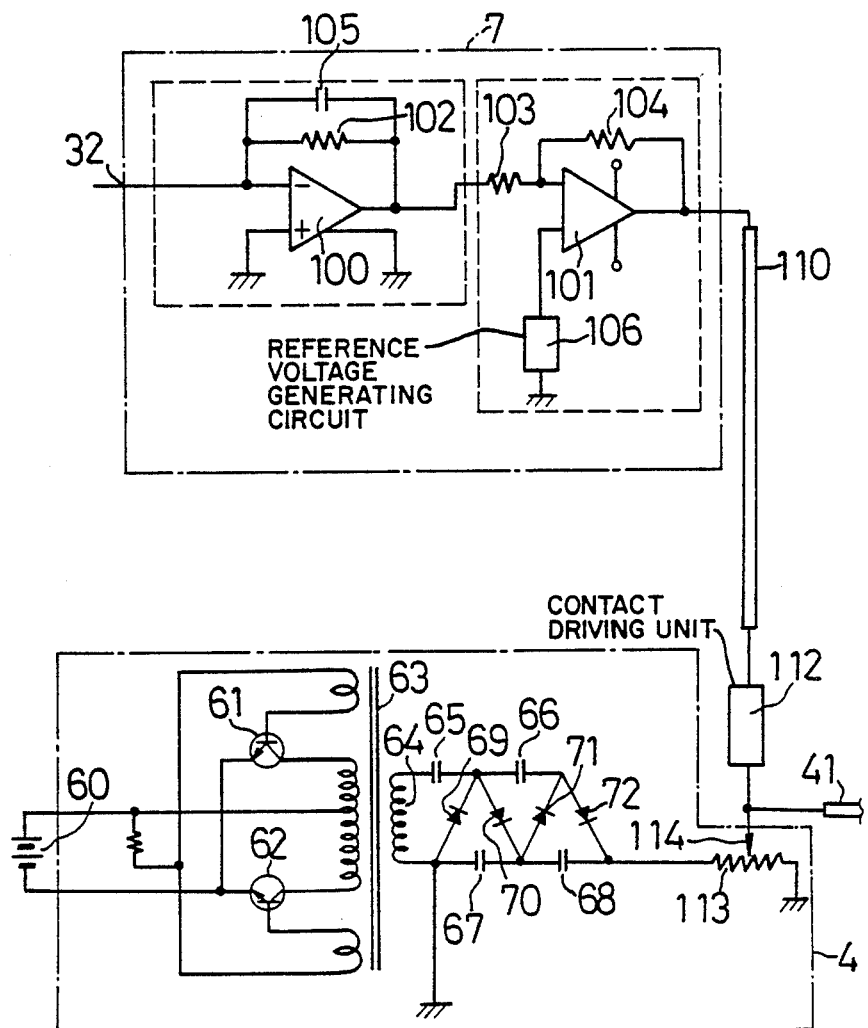
FIG. 15 is an electric circuit diagram of a feedback circuit and a high-voltage power supply incorporated into the gas rate gyro of FIG, 14.

The feedback circuit 7 and a high-voltage power supply 4 will be described hereinafter with reference to FIG. 15.

Referring to FIG. 18, there are shown a lead wire 32 having one end connected to the feedback circuit 7, an operational amplifier 100 for amplifying a minute current, an operational amplifier 101 serving as a comparator, resistors 102, 103 and 104, a capacitor 105, and a reference voltage generating circuit 106. An ionic current resulting from ions arrested by the grid electrodes 3C and 3C' flows through the lead wire 32 into the operational amplifier 100. Then, the operational amplifier 100 amplifies the ionic current, ànd the operational amplifier 101 compares a voltage corresponding to the amplified ionic current with a reference voltage to provide a difference voltage signal representing the difference between the detected voltage and the reference voltage on a signal output line 110. Increase in the intensity of corona discharge between the needle electrode 2 and the grid electrodes 3C and 3C' causes the number of ions arrested by the grid electrodes 3C and 3C' to increase; consequently, the difference voltage signal provided on the signal line 110 increases accordingly. On the contrary, as the intensity of corona discharge decreases, the difference voltage signal on the signal line 110 decreases. Therefore, the discharge can be maintained in a constant state by driving the sliding brush of a variable resistor 113 included in the high voltage power supply 4 by a contact driving unit 112 according to the level of the difference voltage signal on the signal line 110. The contact driving unit 112 drives the sliding brush 114 so that the higher the difference voltage signal, the higher the resistance of the variable resistor 113. The driving unit 112 may be any suitable known servomechanism comprising a control circuit and an actuator, such as a motor. In FIG. 15, indicated at 41 is a high-tension cable connected to the sliding brush 114 of the variable resistor 113.

Figure 16:
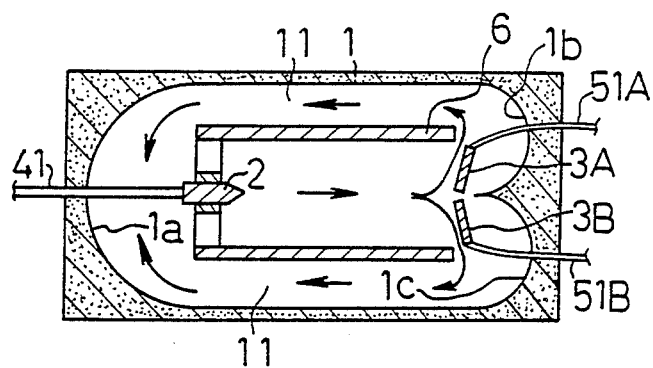
FIGS. 16 and 17 are sectional views typically showing modifications of the casing for a gas rate gyro according to the present invention.
Figure 17:
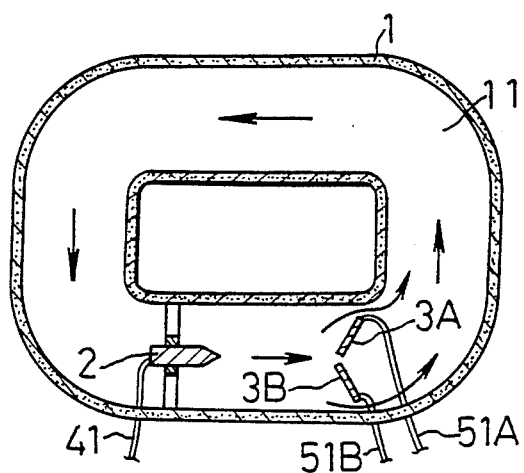

Other Embodiments (FIGS. 16 and 17):

Embodiments shown in FIGS. 16 and 17 are modifications of the forgoing embodiments, employing modified casings facilitating the circulation of the ionic wind.

Referring to FIG. 16, tho inner surface of a casing 1 has one end formed in a semispherical surface 1a and the other end consisting of a pair of semispherical surfaces 1b and 1c symmetrical with respect to the axis of the casing 1. A tubular partition wall 6 having a diameter smaller than that of the casing 1 is disposed coaxially within the casing 1. A needle electrode 2 is held on one end of the partition wall G. A pair of plate electrodes 2 is held on one end of the partition wall 6. A pair of plate electrodes 3A and 3B are disposed at the other end of the partition wall 6. The plate electrodes 3A and 3B are inclined symmetrically to the axis of the casing 1. An ionic wind flows from the needle electrode 2 through the interior of the partition wall 6 toward the plate electrodes 3A and 38 and, after reaching the plate electrodes 3A and 3B, returns through a return path formed between the casing 1 and the partition wall 6 toward the needle electrode 2, so that the flow of the ionic wind within the partition wall 6 is not disturbed.

Referring to FIG. 17, a casing 1 has opposite flat walls. A needle electrode 2 is disposed on one end of one of the flat walls while plate electrodes 3A and 3B are disposed on the other end of the same. The plate electrodes 3A and 3B are inclined symmetrically. An ionic wind flows from the needle electrode 2 along the flat wall on which the needle electrode 2 and the plate electrodes 3A and 3B are provided toward the plate electrodes 3A and 3B, and then returns through a return path 11 toward the needle electrode 2, so that the ionic wind is able to flow smoothly from the needle electrode 2 toward the plate electrodes 3A and 3B.

The foregoing embodiments detect the deflection of the ionic wind proportional to the angular velocity of the mobile object through the detection of the variation of the ionic currents, and obtains a voltage signal corresponding to the variation of the ionic currents by the detecting circuit. This voltage signal obtained by the detecting circuit can be used as an indication of the yaw rate of the mobile object, such as an automobile. Thus, the gas rate gyro of the present invention is applicable to an automobile to detect the yaw rate of the automobile resulting from the rotatory motion of the automobile, for the auxiliary steering of the rear wheels and for controlling the performance of the suspension system of the automobile.

Although the invention has been described in its preferred forms with a certain degree of particularity, obviously many changes and variations are possible therein. It is therefore to be understood that the present invention may be practiced otherwise than specifically described herein without departing from the scope and spirit thereof.

What is claimed is:

1. A gas rate gyro mounted on a mobile object to detect the rotatory motion of the mobile object through the measurement of the deflection of a gas flow varying as a function of the rotatory motion of the mobile object comprising:
    a hermetic casing carried on the mobile object and hermetically containing a gas substantially of neutral molecules;
    a first electrode comprising a needle electrode and disposed at one end of the hermetic casing;
    a second electrode comprising a pair of grid electrodes disposed adjacently and electrically connected so the grid electrodes are at the same potential, and disposed within the casing at a predetermined distance from an opposite to the first electrode;
    a high-voltage power supply which applies voltage across the first and second electrodes to produce a corona discharge around the first electrode so that an ionic wind composed of a mixture of the neutral molecules of the gas and ions produced by ionizing the neutral molecules flows from the first electrode toward the second electrode;
    a detecting electrode comprising a pair of split electrodes for giving electrons to the ions contained in the ionic wind, disposed at a position within the casing at a predetermined distance from the first electrode where the ions produced by a corona discharge are not annihilated; and
    a detecting circuit, connected to said pair of split electrodes, which detects the intensity of difference between the ionic currents flowing respectively through the split electrodes to detect a rotatory motion of the mobile object through the measurement of the deflection of the ionic wind resulting from the rotatory motion of the mobile object.

2. A gas rate gyro according to claim 1, wherein said second electrode is disposed between said first electrode and said detecting electrode.

3. A gas rate gyro according to claim 1, wherein the pressure of the gas within said casing is in the range of 710 to 810 mmHg.

4. A gas rate gyro according to claim 1, wherein said gas is nitrogen gas, dry air, an inert gas or a mixture of those gases.

5. A gas rate gyro according to claim 1, wherein the size of the meshes of said grid electrode is greater than 0.6D, where D is the diameter of said needle electrode, and said detecting electrode is disposed along an axis of said needle electrode within the 0.6D.

6. A gas rate gyro according to claim 1, wherein the predetermined distance between said first electrode and said detecting electrode is 30 mm or below.

7. A gas rate gyro according to claim 1, wherein said grid electrodes are interconnected electrically by grounded lead wires.

8. A gas rate gyro mounted on a mobile object to detect the rotatory motion of the mobile object through the measurement of the deflection of a gas flow varying as a function of the rotatory motion of the mobile object, comprising:
    a hermetic casing carried on the mobile object and containing a gas having suitable pressure for corona discharge;
    a first electrode disposed at one end of the casing to generate ions by the corona discharge having a potential core extending in alignment with an axis of the first electrode;
    a second electrode comprising a pair of grid electrodes disposed adjacently and electrically connected so that the grid electrodes are at the same potential, and disposed within the casing at a predetermined distance from and opposite to the first electrode;
    a high-voltage power supply which applies a voltage across the first and second electrodes to produce the corona discharge around the first electrode;
    a detecting electrode for giving electrons to the ions contained in the potential core passing through said second electrode, disposed at a position within the casing at a predetermined distance from the first electrode where the ions produced by the corona discharge are not annihilated; and
    a detecting circuit which detects the intensities of ionic currents flowing through the detecting electrode to detect a rotatory motion of the mobile object through the measurement of the deflection of the ionic wind resulting from the rotatory motion of the mobile object.

* * * * *